United States Patent

Ogiso et al.

[15] 3,704,656

[45] Dec. 5, 1972

[54] EXPOSURE DETECTOR DEVICE AND A CAMERA SYSTEM WITH THE EXPOSURE DETECTOR DEVICE

[72] Inventors: Mitsutoshi Ogiso, Kawasaki; Katsuhiko Yamada, Yokohama, both of Japan

[73] Assignee: Canon Kabushiki Kaisha, Tokyo, Japan

[22] Filed: April 12, 1971

[21] Appl. No.: 133,080

[30] Foreign Application Priority Data

April 14, 1970 Japan ................................45/31852

[52] U.S. Cl. ........................................95/42, 307/257

[51] Int. Cl. ............................................G03b 19/12

[58] Field of Search...........307/257; 95/10 C, 10 CE, 10 CD, 95/10 CT, 42

[56] References Cited

UNITED STATES PATENTS 3,452,656 7/1969 Rühle et al..........................95/10 CE 3,230,847 1/1966 Gregory, Jr. et al................95/10 CE

*Primary Examiner*—Smauel S. Matthews

*Assistant Examiner*—Richard A. Wintercorn

*Attorney*—Toren and McGeady

[57] ABSTRACT

An exposure detector device for a camera comprising a comparator circuit having at least a photo-sensitive element and a variable resistance element, a detecting means being connected to the comparator circuit, a power source for the comparator circuit and the detecting means, and a switching means for the interruption of the power supply from the power source to the detecting means, and whereby the detecting means is retained at a balanced state of the comparator circuit.

11 Claims, 10 Drawing Figures

INVENTORS
MITSUTOSHI OGISO
KATSUHIKO YAMADA
by Toren & McGeady
ATTORNEYS

INVENTORS
MITSUTOSHI OGISO
KATSUHIKO YAMADA
by
Toren & McGeady
ATTORNEYS

INVENTORS
MITSUTOSHI OGISO
KATSUHIKO YAMADA by Toren & McGeady
ATTORNEYS

*INVENTORS*
MITSUTOSHI OGISO
KATSUHIKO YAMADA by *Toren & McGeady*
ATTORNEYS

INVENTORS
MITSUTOSHI OGISO
BY KATSUHIKO YAMADA
Toren and McGeady
ATTORNEYS

INVENTORS
MITSUTOSHI OGISO
BY KATSUHIKO YAMADA
Toren and McGeady
ATTORNEYS

EXPOSURE DETECTOR DEVICE AND A CAMERA SYSTEM WITH THE EXPOSURE DETECTOR DEVICE

This invention relates to exposure detector means or exposure value control means, and particularly, although not exclusively, to camera systems utilizing such means.

An object of the invention is to provide a complete system for an electric eye camera.

In particular, the object of the present invention is to provide a device, set forth in claim 1. The present invention is characterized in that, firstly, in a control system, in which the load between the primary terminals of a transistor output circuit of bridge connection is controlled for driving by a control input, said transistor output circuit is provided with an end switch, which makes the operation off respectively at both ends of the preset variation zone of load, so as to stop the load operation outside the preset variation zone; secondly, the output of a comparator circuit is further utilized for said control input and besides, said comparator circuit is automatically controlled by the output of the load; thirdly, the output of a resistance bridge circuit, having a photo-electric element, is through a primary differential amplifier and a secondary reverse differential amplifier, put in a driving control circuit so as to keep said resistance bridge circuit balanced through an electro-magnetic output device, connected with an output circuit of the driving control circuit; fourthly, further, a feedback path for control of the electro-magnetic output device, consisting of a resistor and a capacitor, is connected with the intermediate between said output circuit and the input circuit of said primary differential amplifier; fifthly, the control output of an automatic exposure value control device, controlled in response of the light input to the photoelectric element of a single lens reflex camera of a TTL photometric system, is stored in the memory before said light input is interrupted, and besides, said control output is released from the memory storage through a delay circuit when said light output is released from the interruption; sixthly, the control output of an automatic exposure value control device, controlled in response of the light input to the photoelectric element of a single lens reflex camera of a TTL photometric system, is stored in the memory before said light input is interrupted, while said stored memory is released after said light input is released from the interruption, and besides, an element, having an excellent transient response characteristic, is adopted for said photoelectric element; seventhly, the output of a Schmidt circuit, consisting of an output transistor, which is turned on over a prescribed voltage and off below a prescribed voltage, and a transistor, which is turned off over a prescribed voltage and on below a prescribed voltage, is amplified through an amplifier transistor, having an opposite polarity, and the output circuit of the amplifier transistor is connected with a parallel circuit of a constant voltage element and a lamp so as to check the voltage.

The present invention will be described in reference to the attached drawings in which.

FIGS. 8–A and 8–B illustrate respectively the main parts of a finder, which is also provided with a photoelectric element for a bias light, in addition to a photometric photoelectric element, in order to make the response delay of the photoelectric element less in a variation of the device according to the present invention.

Figure 1:
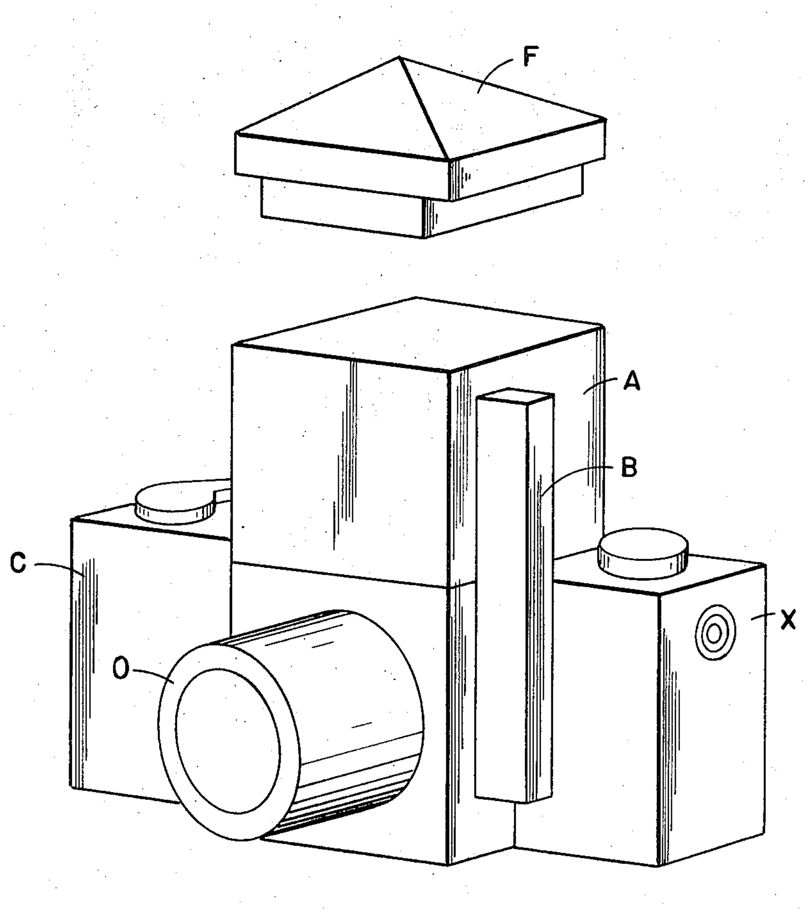
FIG. 1 shows a block construction of an embodiment in case of an exposure value control device according to the present invention being constructed as an attachment for an electric eye.

The present invention is explained in detail with reference to the drawings of the various embodiments. FIG. 1 shows a device according to the present invention, which is constructed as a finder body A, having an automatic control mechanism, provided with a photometric element for operation of a shutter preference EE camera, by that a finder body F, combined with a diaphragm preference or shutter preference camera body C, is taken away and the device is attached in place of the same. O shows a lens body, which is by a connecting member B combined with the finder body A through the camera body C. X is a connector for a synchro-contact.

Hitherto, there has already been known the German Pat. No. 1,224,604 for a finder body, having a photometric element contained inside. In this case, the photometric device inside the finder body is controlled by a photographing information, set on a camera side; and further, the photographing information on the camera side is controlled by the output signal, dispatched from the photometric device inside the finder body.

However, the device according to the present invention comprises that a photographing information is set on the side of the finder body A, whereby the output of the photometric device is controlled inside the finder body A so as to control a diaphragm preset ring of an interchangeable lens, attached on the camera side.

Figure 2:
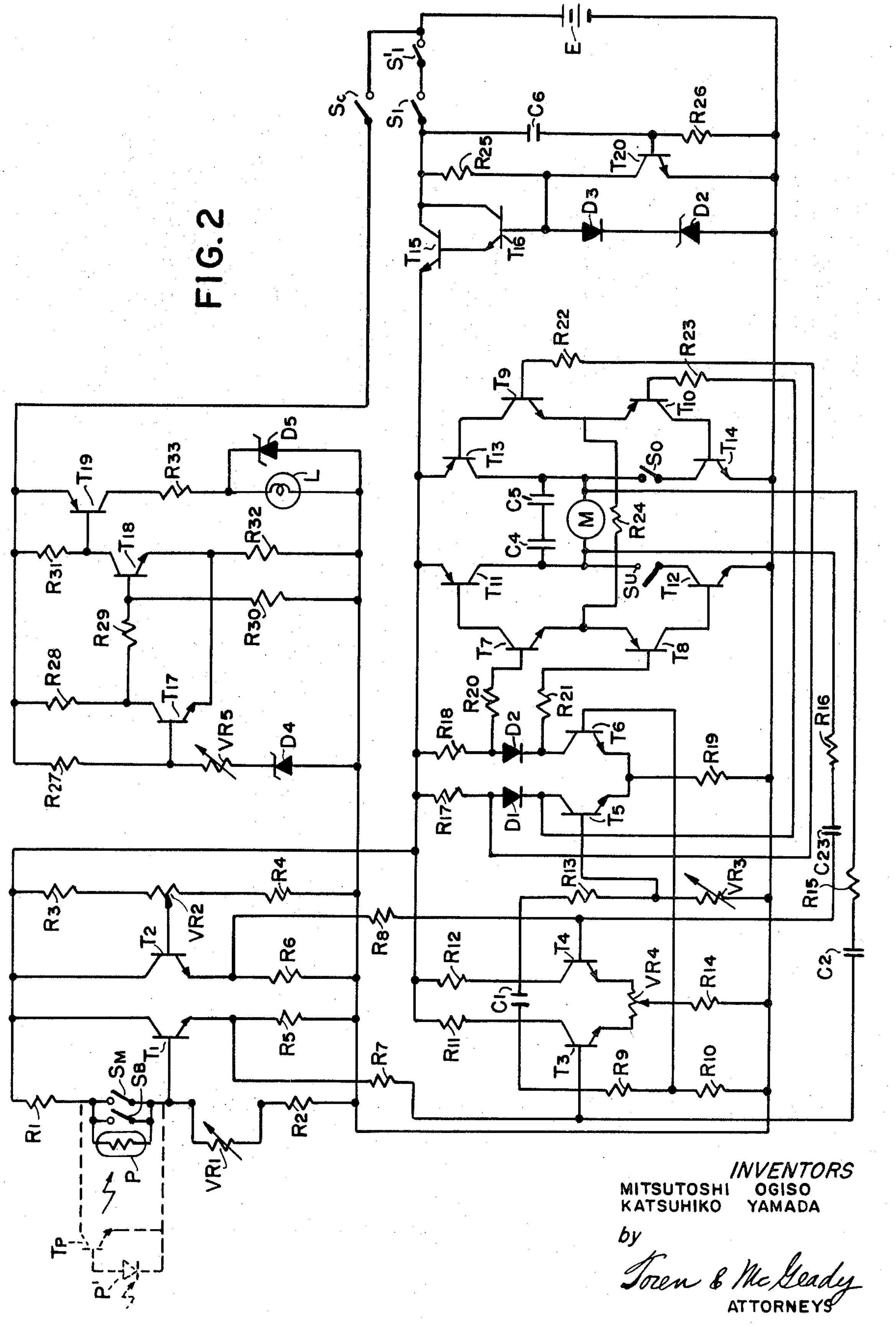
FIG. 2 shows an electrical wiring diagram of an example of the device in accordance with the present invention.

FIG. 2 is an example of a schematic circuit diagram for the device of the present invention. In the drawing, P is a CdS element for a photoelectric element, which may be replaced by a coupled circuit, consisting of a photoelectric P′ and a transistor $T_P$, as shown by a dotted line. $R_1$, $R_2$, $R_3$ and $R_4$ are fixed resistors. $VR_1$ is a resistor, variable corresponding to a diaphragm. The resistance value is set and maintained by a motor M, driven in response to the output of a resistance bridge circuit. $VR_2$ is a circuit regulation resistor. $S_B$ and $S_M$ are switches, which are respectively closed when photographing with a flashbulb or photographing with manual setting. Respective transistors $T_1$ and $T_2$ are connected to the output terminals of the resistance bridge circuit. The respective emitters thereof are connected with output transistors $R_5$ and $R_6$. $R_7$ and $R_8$ are respectively intermediate resistors. The output of the resistance bridge circuit is applied by the transistors $T_1$ and $T_2$ and the resistors $R_5$, $R_6$, $R_7$ and $R_8$ to a differential amplifier composed of transistors $T_3$ and $T_4$. The differential amplifier includes resistors $R_9$, $R_{10}$, $R_{11}$, $R_{12}$ and $R_{13}$, and a circuit regulation resistor $VR_3$, as well as a regulation resistor $VR_4$ for correction of the characteristics of the transistors, an emitter biasing resistor $R_{14}$ and a capacitor $C_1$ for preventing so-called parasitic oscillations. The output of the differential amplifier is applied to a reverse differential amplifier, composed of transistors $T_5$ and $T_6$. The output circuit of the latter reverse differential amplifier is, as shown in the drawing, connected with output resistors $R_{17}$ and $R_{18}$, as well as, with diodes $D_1$ and $D_2$ and resistors $R_{20}$, $R_{21}$, $R_{22}$ and $R_{23}$, and also a current supply resistor $R_{19}$.

Transistors $T_{11}$, $T_{12}$, $T_{13}$ and $T_{14}$, are connected to form a bridge with each other. The bridge is connected to the output of transistors $T_7$, $T_8$, $T_9$ and $T_{10}$. The latter transistors receive signals from the output circuit of said differential amplifier through resistors R°, $R_{21}$ and $R_{23}$. The output circuit of $T_{11}$, $T_{12}$, $T_{13}$ and $T_{14}$, drives a motor M in a manner corresponding to the change of the input from the differential amplifier. A damping resistor $R_{24}$ is connected as shown in the drawing. Polarized capacitors $C_4$ and $C_5$ are so connected so as to constitute a non-polarized capacitor for absorption of electric noise. Switches Su and So are arranged in the output circuit of bridge formed by the transistors $T_{11}$, $T_{12}$, $T_{13}$ and $T_{14}$, to control power to a motor M, on the basis of the under-exposure or the over-exposure. The switches are closed when the device is not controlled within the photometric range. Accordingly, if the device is restored for control within the photometric range by the shutter time being reset, as it is being discerned through a warning means, installed inside the finder, and appropriate photographing can be done for the present. Means such as a warning by lamp, a warning by sound or the like, may be utilized for the warning means. Generally speaking, it is very effective to use the above-mentioned switches Su and So, when the load of the output circuit of transistors, connected in bridge, is driven and controlled by such a control output as the output of a comparator circuit. For example, if the motor is used for an electro-motive zooming and the switches Su and So are used an end switches for the longest focus length and the shortest focus length respectively, So, it becomes possible by a quite simple construction to control the driving of the motor, including a switch for a zooming button as a control output. And moreover, Su and So can be restored from open to closed by the motor itself, which is driven by such an input means as a zooming switch. Therefore, it is very advantageous in case of a servo-control.

Next, we will get back to the explanation of the circuit for the embodiments. The motor M is subject to a so-called hunting phenomenon when the intensity of a light input is suddenly varied. Therefore, it is necessary to create an appropriate damping effect while considering responsiveness. For the purpose of the above, the terminals of the motor are respectively connected with each group of resistor and capacitor, namely $R_{15}$, $C_2$ and $R_{16}$, $C_3$, which are respectively connected with the input circuit of the differential amplifier, having the transistors $T_3$ and $T_4$. In this case, the capacitors $C_2$ and $C_3$ filter out the direct current component, while a variable high frequency portion is passed, and act so as to suppress the change of the speed of the motor. The damping effect is brought about by $C_2$, $R_{13}$, and $C_3$, $R_{15}$ in the form of a triple negative feed-back.

In the power source circuit transistors $T_{15}$ and $T_{16}$ form a Darlington connection. The circuit is connected in series with a battery and the before-mentioned group of load circuits. It is connected to be controlled by a constant voltage, set through a bleeder resistor which is connected in parallel with the battery. The bleeder resistor is composed of a resistor $R_{25}$, a diode $D_3$ and a Zener diode $D_z$. In this case, the diode $D_3$ is connected in a normal direction for protection against a reverse voltage being mistakenly applied by reversal of the polarity of the power cell. It may be said in this connection that diode $D_3$, having a saturation voltage of about 0.5 volt in a normal direction, is used when the Zener voltage of $D_z$ is 6 volts.

In the power source, a switch $S_1$ serves as a main switch. A switch $S_1$ is turned off in response to the mirror being flipped up (or a stopping-down of the lens by a stopping-down lever). (In relation to this switch, the synchro-contact in the camera body C may be electrically reverse to be used). The switch $S_1'$ is used in order to store a diaphragm value in the memory so as to prevent the value from change in response to changes in the light sensed when the mirror is up and when light is measured in a light path of the finder and the diaphragm value is controlled by a servo mechanism through an automatic control circuit.

If a current is passed through the load circuit from a battery E directly after the following mirror-down the system reacts unfavorably if the photoelectric element, such as a CdS element has an inferior response characteristic to a transition from dark to brightness. Therefore, the voltage of the power source is applied to the load circuit after the lapse of a suitable time, namely one longer than for the transient response characteristic of the photoelectric element. In the delay circuit for the above, the resistor $R_{25}$ is connected with a transistor $T_{20}$, a capacitor $C_6$ and a resistor $R_{26}$ as shown in the drawing This makes it possible to prevent erroneous operation due to the transient response characteristic of a CdS element. According to one embodiment a coupled circuit as shown in broken lines in the drawing is used for a photoelectric element. In this case, a delay circuit may be omitted.

The system includes a checker circuit for the power source. The before-mentioned circuit for stabilization of the power source is such that the device can be operated stably at 7 to 12 volts. Therefore, current through the checker circuit, may vary. Accordingly, the device may be constructed to indicate the influence of such a change, by the indication of an ammeter or the intensity of light, when a lamp is lighted. However, with prior art circuits it becomes impossible to show the working limit satisfactorily.

In the embodiment shown, the device is constructed to indicate the working limit by a lighting of a lamp, whereby the life of the lamp can be made longer and also, the intensity of light can always be maintained almost constant when the lamp is lighted.

In the drawing, $R_{27}$, $R_{28}$, $R_{29}$, $R_{30}$, $R_{31}$, $R_{32}$ and $R_{33}$ are resistors; $VR_5$, a variable resistor; $T_{17}$ and $T_{18}$, transistors, composing a Schmidt circuit; $T_{19}$, a transistor, connected with the output circuit of the Schmidt circuit; $D_4$, a Zener diode constant voltage element; $D_5$, a Zener diode constant voltage element, by which a current variation due to the voltage fluctuation in the battery can be absorbed to obtain a constant voltage; and L, a lamp, lighted with an almost constant brightness, when the battery is a source of a higher voltage than the working limit. A check switch Sc turns the checker circuit on or off.

An example of a mechanical construction for the device according to the present invention will be explained in detail referring to FIG. 3, as follows.

Figure 3:
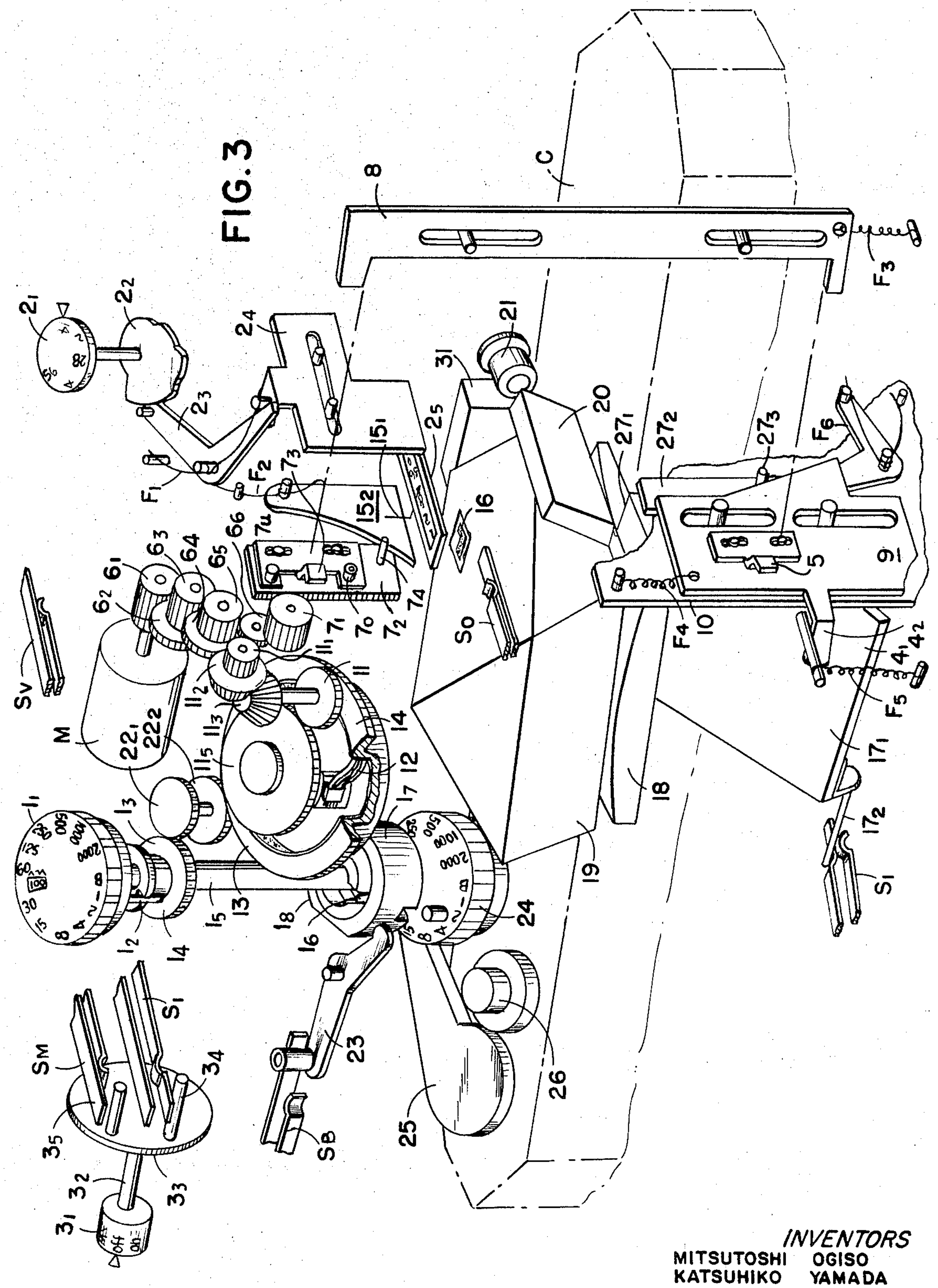
FIGS. 3 and 4 are embodiments, showing a mechanical construction of an exposure value control device according to the present invention. The construction, shown in FIG. 4, is suitable for the circuit to be miniaturized and for the motor to be made small-sized, because a motor, having a small power, can be used as compared with that of FIG. 3.

In FIG. 3 a shutter dial 1, for an attachment which sets a shutter time as well as a film sensitivity. The rotation of the shutter dial $1_1$ is transmitted to a gear $1_4$, integrated with a notched plate $1_3$, by means of engagement of the notched plate $1_3$ with a pin $1_2$, integrated with the shutter dial. A shaft $1_5$ is integral with the shutter dial $1_1$. A joint $1_7$, restricted in rotation by a pin $1_6$, which is integral with the shaft, is to be engaged with a shutter dial 24 of the camera body.

A dial 2, sets an open diameter of the lens in order to set an open diaphragm value of the lens body O, attached to the camera. By the rotation of the dial, the holder $2_4$ of a diaphragm scale $2_5$ is moved by means of a lever $2_3$, engaged with a cam 2, which is integrated with the dial. The dial is used in order to correct the exposure value distortion, caused in the control device by exchange of lenses exchange. A spring $f_1$ make the lever $2_3$ and the holder $2_4$ contacted always contact the cam $2_2$. The condition, shown in the drawing, is the case that a diaphragm value is set to 14.

A knob 3, turns the main switch $S_1$ of the exposure value control device on or off. A disk $3_3$ is attached on the other end of a shaft $3_2$, integrated with the knob, and holds switching pins $3_4$ and $3_5$. The drawing shows the condition in which $S_1$ is off. In order to be switched for a manual operation, the knob is set to M, and then, the switch $S_1$ is turned on, while the switch $S_M$ for a manual operation remains on. Therefore, the knob can be used for manual diaphragm control. When the knob $3_1$ is placed in the on position, the pin $3_5$ makes the switch $S_M$ turn off and also the pin $3_4$ turns the switch $S_1$ on, so that the device displays a EE function, when the switch $S_B$ is off.

A member 4, interlocked with the automatic diaphragm preset ring of the lens body O, is shown in the drawing as being pulled by the spring $F_5$ in one direction to the side of the lens body. The lens body O is, of course, formed as one body of the camera body C, unless an interchangeable lens is used. Even when an interchangeable lens is used, it is possible that the construction be such that a member, which corresponds to the pin $4_1$, is installed on the camera side to be interlocked with the interchangeable lens.

M is a driving motor for servo-control of the automatic exposure control device. The rotation is transmitted to a gear $7_1$ for controlling the preset position of the diaphragm and also for indication, through a train of gears $6_2$, $6_3$, $6_4$, $6_5$ and $6_6$, interlocked with a gear $6_1$, which is co-axial with the motor. The rotation is also transmitted to a gear $11_1$ for regulation of a resistor $VR_1$ in order to regulate the open photometric resistor $VR_1$, which is variable, corresponding to the preset diaphragm value of the lens body.

It will do well if the preset interlocking pin may be interlocked with the motor M by some means. However, in this embodiment, in order that the camera body C, which operates as a conventional time preference, diaphragm preference camera, can operate, even when the lens body is detached, (if the finder body F is attached), the pin is constrained to contact the upper end of a bent member $4_2$, integrated with an intermediate plate 9. The plate 9 which is restricted in its motion by a pin, mounted on the mirror box 10 of the camera body. The lower end of the projection 5, integrated with the intermediate plate 9, is linked with the motor M. The intermediate plate 9 serves for presetting the diaphragm value indicated by an aperture needle 27. The latter corresponds to a preset diaphragm value as well as the pointer of an exposure meter (not shown in the drawings) incorporated in the camera body in the outside of the finder view field through an optical system (omitted from the drawings) contained in the finder assembly F when a camera having an incorporated exposure meter is connected with a finder assembly F. Members $27_2$, $27_3$ and $F_6$ form an association mechanism for that purpose.

Accordingly, the spring $F_5$ is provided with a strong charging force, as compared with the spring $F_4$, one end of which is fixed on the camera body.

The following explains the linkage between the motor M and the lower end of the projection 5 of the intermediate plate 9.

The upper end of a projection $7_3$, integrated with a plate $7_2$ for controlling a diaphragm preset position, which moves interlocking with a gear $7_1$, and the lower end of a projection 5 on the intermediate plate 9 of the camera side are connected by means of a reciprocating arm 8. The arm 8 is always pulled down by a very weak spring $F_3$.

The example in the drawing shows the device according to the present invention constructed for the finder body of FIG. 1, and moreover, a small number of switches are used. When the finder body is attached to the camera body and said finder body and the camera body are connected by said arm 8, the projection of said arm 8 is always pulled down by a strong spring $F_3$ when the projection 5 is not restricted on the camera body side, in order that the projection of the arm 8 may not put the projection $7_3$ on said finder body side and the projection 5 on the camera body side into a wrong place. Therefore, it is necessary to move down the projection $7_3$ on the finder body side by the knob $3_1$, set in the M position. It may be unnecessary to set the knob $3_1$ in the M position, when the finder body is attached to the camera body, even in the above case, by that the attachement of the arm 8 of the body A is interlocked with switches, if the number of switches can be increased.

Pins 7u and 70, mounted on said control plate $7_2$, causes switches Su and So to operate within the respective upper and lower limits. A pin $7_3$ on the same control plate $7_2$ is always contacted by a spring $F_2$ with a cam plate $15_2$, having a pointer $15_1$ for indicating the diaphragm scale, and moves said control plate $7_2$ up and down by the operation of the servo-motor M, whereby the diaphragm value, showing the position, is indicated.

When the shutter dial $1_1$ is set to bulb (B), one end of the lever $2_3$ is slipped down into the notched portion $1_3$ of the joint, so that the bulb switch $S_B$ is turned on.

In operation a finder assembly F connected to the camera body C is dismounted, and a finder assembly A according to the present invention is mounted in place of the assembly F, so that the groove of the joint $1_7$ engages the pin of the shutter dial 24. In this way, when the dial $1_1$ is rotated the dial 24 rotates so that a shutter speed may be set as desired.

Also, the projection $7_3$ of the control plate $7_2$ and the projection 5 of the intermediate plate 9 on the camera side are connected by the arm 8. Therefore, the rotation of the servo-motor is transmitted to the control plate $7_2$ and then transmitted to the preset signal pin 4 on the lens side through the arm 8, the projection 5, the intermediate plate 9 and its curved upper end $4_2$.

Figure 5:
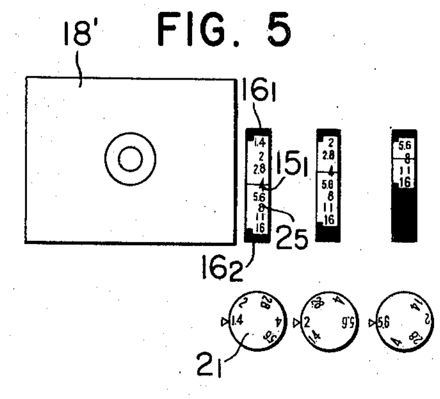
FIG. 5 illustrates a warning, indicated inside a finder.

When the dial $2_1$ for setting the lens open is set to the aperture of the mounted lens, the diaphragm meter $7_5$ is moved through the cam $2_2$, the lever $2_3$ and the holder $2_4$ so that the relation between the aperture of the individual lens and the warning mark as shown in FIG. 5 is established.

When the shutter dial $1_1$ is set to turn the switch nob $3_1$ "on," the switch $S_1$ is closed and the switch $S_M$ is opened by means of the shaft $3_2$, the disk $3_3$ and the switching pins $3_4$ and $3_5$, conditions are set for performing EE functions. Then when the camera is directed to an object to be photographed, the light received through the lens O reaches the photo-sensitive elements 21 provided by the both sides of the finder eyepiece 31 through the reflecting mirror 17, the condenser lens 18, and the pentadach prism 19. In this case, when the resistance of the photosensitive element 21 and a preset sliding resistance, namely the resistance at the contacting position of the brush and the sliding resistor 13 are different, electric current passes through the bridge circuit. The current is amplified by a differential amplifier so that the servo motor M is rotated and its rotation is transmitted to the brush 12 through the gears $6_1$, $6_2$, $6_3$, $6_4$, $6_5$, $11_1$, $11_2$, $11_3$, $11_4$ and $11_5$ until the bridge circuit is balanced at the same resistance value as the resistance value of the photo-sensitive element 21 and the rotation of the motor M stops. At the same time, the rotation is transferred to the projection $7_3$ from the gear $6_1$ through the gear $7_1$ and the control plate $7_2$, and then transferred to the diaphragm preset signal pin $4_1$ through the arm 8, the projection 5, the intermediate plate 9 and its curved upper end $4_2$ to preset a diaphragm value. Also the movement of the control plate $7_2$ is transferred to the pointer $15_1$ through the pin $7_4$ and the cam plate $15_2$ to indicate the preset diaphragm value on the scale plate $2_5$.

The scalings on the diaphragm plate $2_5$ can be seen outside the finder view field through the samll prism 20 and the penta-prism 19 as shown in FIG. 5. At this time, the aperture needle $27_1$ incorporated in the camera body and the pointer of the exposure meter not shown in the drawings are not indicated because there is no optical system for introducing them.

Also, when the shutter dial $1_1$ is rotated, the gear 14 is rotated by means of the pin $1_2$, the notched plate $1_3$, the gears $1_4$, $22_1$ and $22_2$, so that the contacting position of the sliding resistor 13 attached to the inside of the gear 14 and the brush is changed, namely the resistance value is changed, and thus the motor rotates to a balanced position.

In the drawings, the control plate $7_2$ moves upwards when the object to be photographed is dark to widen the diaphragm and moves downwards when the object is bright to narrow the diaphragm. At the lower and upper limits of the movement, the switches $S_u$ and $S_o$ are opened respectively to give signals of reverse direction.

When the shutter dial is set to the bulb (B) one end of the lever 23 dropps down in the notched portion $1_8$ of the joint $1_7$ to close the bulb switch $S_B$ to short-circuit the photo-sensitive element 21 so that the control plate $7_2$ moves downwards to open the switch $S_o$ and stops until the bulb switch $S_B$ is opened.

Then when the switch nob $3_1$ is set to M the switch $S_1$ is closed and the switch $S_M$ is closed. Similarly in case of the above mentioned state of the bulb (B), the photo-sensitive element 21 is short-circuited so that the control plate $7_2$ moves downwards to close the switch $S_o$ and stops there. At this time, the intermediate plate 9 and the curved portion $4_2$ also move to the lowest position so that the diaphragm preset signal pin can be freely moved against the spring $F_3$ by means of an operating member not shown such as a preset ring etc. to manually preset the diaphragm.

Also when the switch nob $3_1$ is set to M, the projection $7_3$ of the control plate $7_2$ on the finder assembly A side stops at the lowest position while the arm 8 is biased downward by the spring $F_4$ so that connection can be made without misengagement of the projections wherever the projection 5 of the intermediate plate 9 on the camera side may be positioned.

Figure 4:
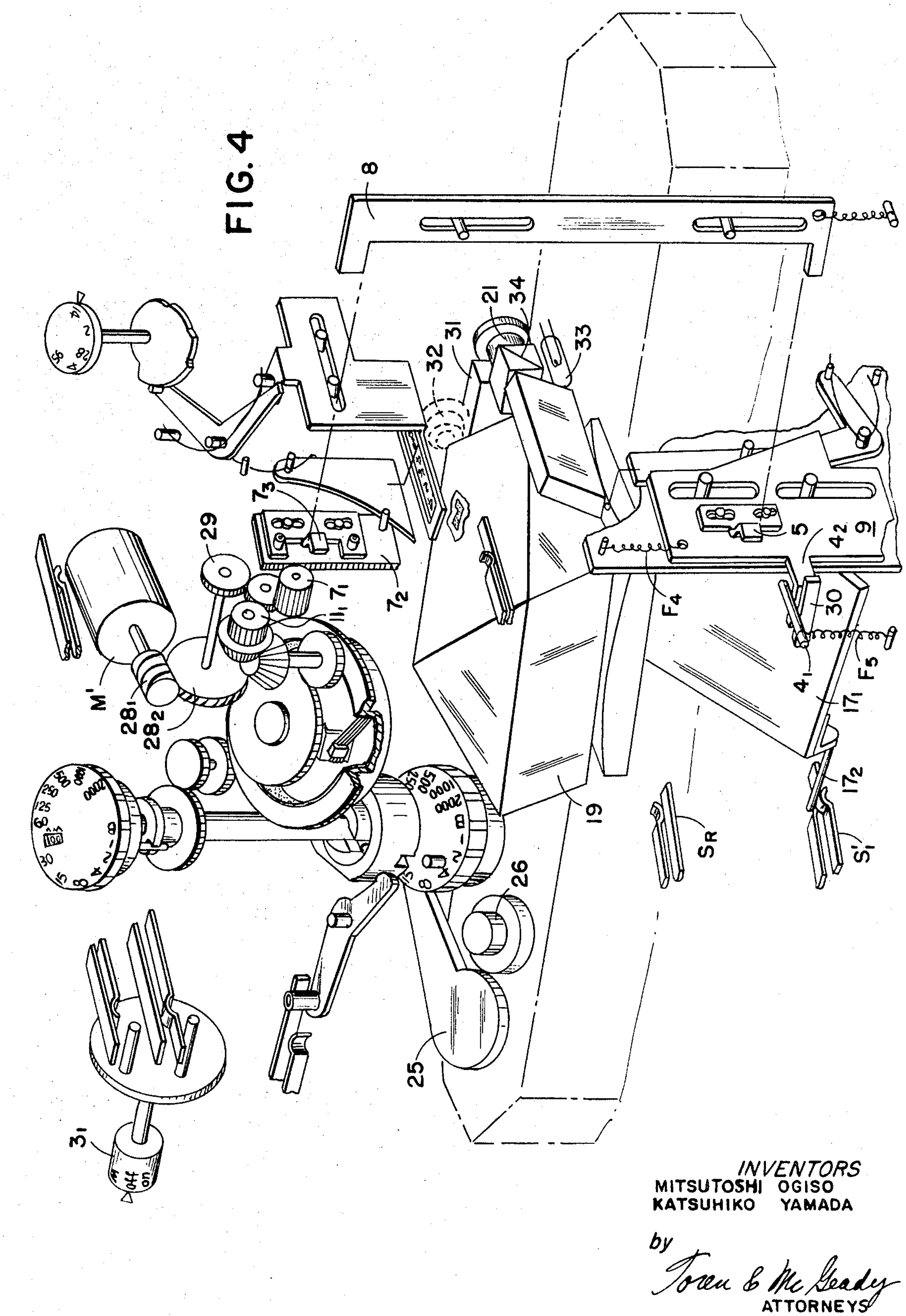

The differences between FIG. 3 and FIG. 4 are that in FIG. 4 the gear arrangement connected to the servo motor M is modified to a worm mechanism in which no motive power is transferred from a worm wheel to a worm gear.

The power from the servo motor M is transmitted to the gear $7_1$ for actuating a control plate for diaphragm position and the gear $11_1$ for adjusting sliding resistance respectively through the worm gear $28_1$, worm wheel $28_2$ and gears 29 and $6_6$. Subsequent operations are same as in FIG. 3. Regarding the operations on the camera body side, an additional member 30 is provided which is released by a shutter button etc and charges the diaphragm preset signal pin 4 in association with the actuation of the winding lever 25, and the spring $F_4$ of the intermediate plate 9 is disengaged.

When photo-sensitive element 21 is composed of a photo-conductor P in the embodiment shown in FIG. 3, a delay circuit including $C_6$ and $R_{26}$ shown in FIG. 2 is required. However, in the embodiment shown in FIG. 4 no delay circuit is required even when a photo-conductor P is used as the photo-sensitive element.

In this case, the switch $S_1'$ turns off in the initial mirror-up operation to cut the motor circuit and makes the switch $S_R$ at the finish of the mirror-up operation so as to illuminate the lamp 33 for bias light. Thus the light directed to the photo-conductive element 21 is reflected by a beam splitter 34 and incidenced by the lap 33 as a bias light so that the time response characteristics of the device is not damaged at all even during continuous rapid photographing.

Figures 8A, 8B:
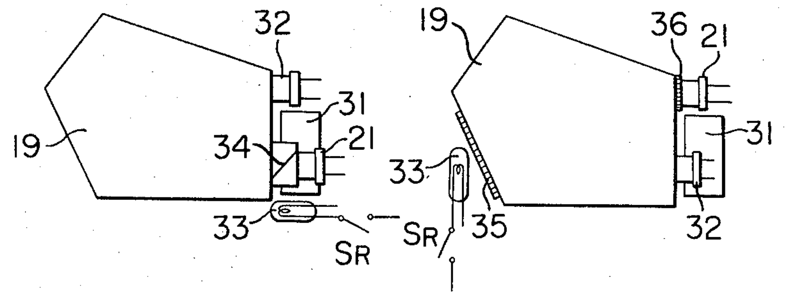

In the embodiments shown in FIG. 3 and FIG. 4 the switch $S_1'$ shown in FIG. 2 is associated with the mirror-up. However, the switch $S_1'$ may be made contactless by providing the photo-sensitive element 32 shown by a dotted line in FIG. 4 in the light path of the finder so as to detect the on and off of the light to the element 32 in response to the mirror-up. In this case, instead of the arrangements shown in FIG. 4 and FIG. 8A, the arrangement shown in FIG. 8B may be employed. In FIG. 8B, 35 is a polarizer and 36 is an analyzer positioned in the right angle relation to the polarizer 35.

Next, the operation of the above embodiment will be described.

First, at the time of film winding-up, the diaphragm preset signal pin 4 is charged by the charge member 30. The switch nob $3_1$ is made "on" to effect exposure measurement, and if the photo-sensitive element 21 and the resistance value of sliding resistance are not balanced, the motor begins to rotate and the rotation is transmitted to the gears $7_1$ and $11_1$ through the worm gear $28_1$ and $28_2$ and the gear 29. Subsequent operations thereafter are as already described in reference to FIG. 3.

In FIG. 3 it is necessary that the motor M moves the diaphragm preset signal pin 4 against the strong spring $F_5$. However in FIG. 4 as the diaphragm preset signal pin is charged beforehand, the motor has only to actuate the other mechanisms and thus a small motor can be used.

Now by pushing down the release button on the camera body to liberate the charge member 30, the diaphragm preset signal pin 4 returns due to the spring $F_5$ and stops at a value set by an EE mechanism of the finder assembly A to determine the lens aperture.

The power exerted by the strong spring $F_4$ is transferred to the worm wheel $28_2$ and the worm gear $28_1$ through the curved portion $4_2$, the intermediate plate 9, the projection 5, the arm 8, the projection $7_3$ and the gears $7_1$, $6_6$, 29, and the power in a reverse direction is sustained by the worm mechanism.

The embodiment shown in FIG. 7 will be explained by referring to FIG. 6A and FIG. 6B.

Figure 6A:
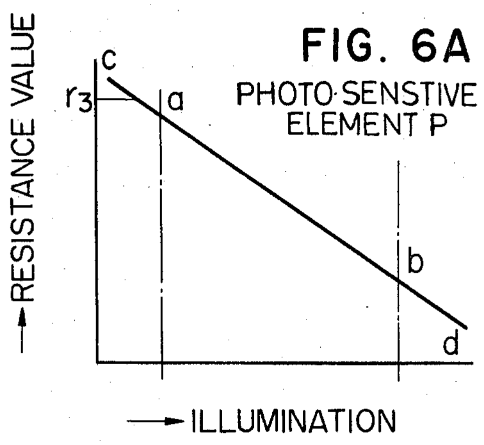
FIGS. 6A and 6B are curves, showing resistance value characteristics, corresponding to the respective illuminations, when light is received in a photo-electric element and a variable resistor, which are used in the device according to the present invention.
Figure 6B:
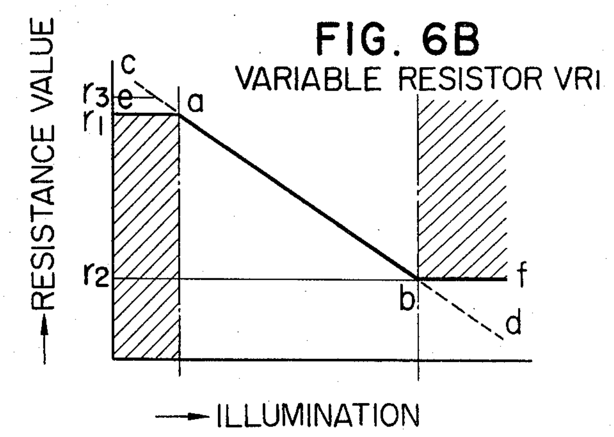

FIG. 6A and FIG. 6B show resistance characteristics against illumination of the photo-sensitive element and the variable resistor used in the present inventive device. In both of FIG. 6A and FIG. 6B, resistance values respectively corresponding to *a* and *b* are set in a certain relation (for example equal to each other) between a and b and in case of the variable resistor in FIG. 6B, the resistance values are set constant ($r_1$, $r_2$) between *a* and *e* and between *b* and *f*, or the resistance value is set below the constant value ($r_1$) between *b* and *f* and the resistance value is set beyond the constant value ($r_2$) (portions shown by slant lines in FIG. 6B).

Figure 7:
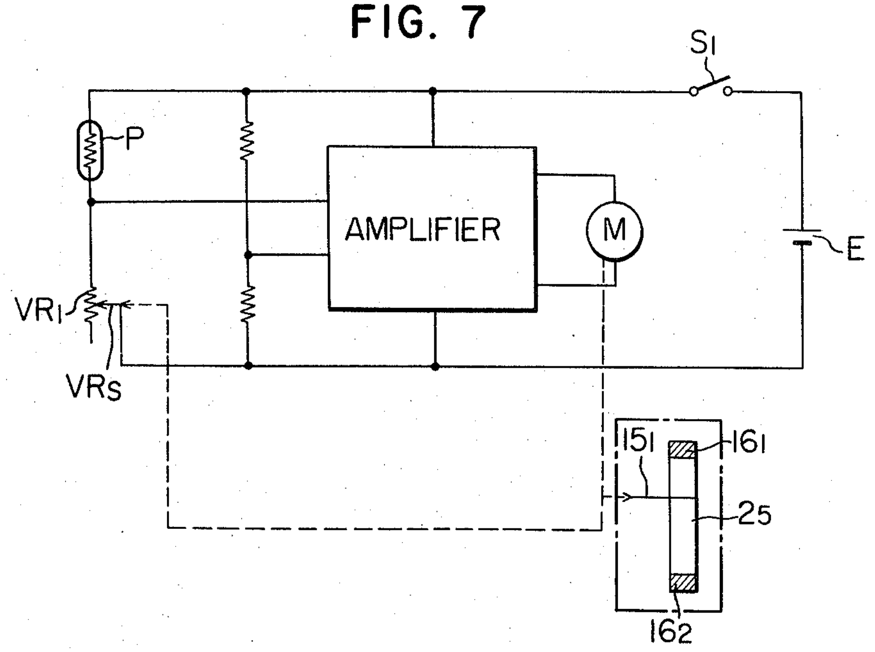
FIG. 7 is a block circuit diagram, showing another inventive embodiment, employing a photoelectric element and a variable resistor, which have respectively the resistance value characteristic, shown in FIGS. 6A and 6B.

In FIG. 7, P is a photo-sensitive element, $R_1$ is a resisting body of a variable resistor which is associated with the member for setting shutter speed and film sensitivity. $VR_S$ is a sliding body which slides on the above resisting body and is actuated by the motor M to vary the resistance values. Signals in the bridge circuit is amplified by the amplifier and transferred to the motor M. E is a power source and $S_1$ is a switch. The associated switch $S_1'$ omitted from the embodiment may be connected in series with the switch $S_1$.

In this embodiment, the pointer $15_2$ which moves in association with the motor M indicates numerical values on the diaphragm value plate $2_5$. The upper and lower slanted portions on the diaphragm value plate are working marks.

Next, the operations of the above embodiment will be described hereinunder.

In FIG. 7, when the shutter speed and the film sensitivity are adjusted and the camera is directed to the object to be photographed, the resistance value of the photo-sensitive element P is determined according to the light input from the object. At this time when the resistance values at the contact point of the resistance body $VR_1$ of the variable resistor and the sliding member $VR_5$ are not balanced, this unbalance is detected by the bridge circuit, the detected signal is amplified by the amplifier 4 to drive the motor M and move the sliding member $VR_5$ until the both resistance values are balanced, when the motor M stops. The movement is led to the pointer $15_1$, which indicates the numerical values on the diaphragm value plate $2_5$.

As the resistance curve of the variable resistor is set as shown in FIG. 6B, when the resistance value of the photo-sensitive element P shows the resistance value $r_3$ between *a* and *c* the sliding member $VR_5$ contacting the variable resistor moves towards *a* to seek for the resistance value $r_3$. But when it passes over a it continues to move towards *e* with the bridge circuit still in unbalanced state, and it stops only when a force is added from outside, for example by switching off or by mechanical stoppage. At this time, the pointer 15, enters the warning mark $16_1$ or moves in association with the motor M. The supporting member, for example, of the pointer makes the switch on to illuminate the lamp or generate warning sounds, whereby the over-pass beyond the extremity of the low-illumination zone in the response range of the photo-sensitive element is indicated. Regarding the high-illumination zone, the same thing can be said in a contrary sense.

What is claimed is:

1. An exposure control system for a camera with an objective lens and a reflex mirror movable into and out of the path of light from the objective lens and whose exposure is adjusted by electromagnetic means, comprising photosensitive means disposed behind the movable mirror and in the path of light from an objective lens for responding to the brightness of a scene being photographed, control circuit means responsive to said photosensitive means and coupled to the electromagnetic means for adjusting the exposure on the basis of the light striking the photosensitive means, an electric power source coupled to said control circuit for actuating the control circuit, and switch means in said control circuit and responsive to movement of the movable mirror out of the path of light, for interrupting the operation of said control circuit.

2. A photographic system, comprising an objective lens, a reflex mirror movable into and out of the path of light through said objective lens, shutter control means, exposure adjusting means including electromagnetic means, photosensitive means disposed to receive light through the objective lens and through the mirror when it is placed in the path of light from the objective lens, a control circuit responsive to said photosensitive means and coupled to said electromagnetic means for adjusting the exposure of the system, and actuating switch means coupled with said control circuit, said switch means being responsive to movement of said mirror for interrupting the operation of said control circuit so as to prevent further adjustment of the exposure.

3. A system as in claim 2, wherein said control circuit comprises a Wheatstone bridge, a comparator circuit responsive to said Wheatstone bridge, said Wheatstone bridge being coupled to said sensitive and responsive thereto, said electromagnetic means including a servo motor coupled to said comparator circuit and responsive to unbalance in the bridge.

4. A system as in claim 2, wherein said switching means is interlocked with said movable mirror and opened and closed by movement of said movable mirror.

5. A system as in claim 2, wherein said switching means includes delay means for delaying the response of the control circuit to said switching means.

6. A camera, comprising exposure adjusting means, regulation limit means for defining regulation limits on said exposure adjusting means, an electric motor coupled to said adjusting means for controlling the adjusting means, photosensitive means mounted for measuring the brightness of the scene to be photographed, comparison amplifying means connected to said photosensitive means and responsive thereto, said amplifying means being coupled to said electric motor for regulating the adjusting means, and limit switching means connected in said comparison amplifying means and responsive to said limit means for interrupting the output of said amplifying means.

7. An exposure control device for a camera, comprising photosensitive means for measuring the brightness of the scene, a control circuit responsive to said photosensitive means and having a driving circuit, exposure value control means, a servo motor connected with said driving circuit and coupled to said exposure value control means for regulating said control means, warning means having indication means coupled with said servo motor, said indication means defining upper and lower limit zones of scene brightness, said control circuit having a bridge circuit, said photosensitive means being connected in said bridge circuit, variable resistance means in said bridge circuit and coupled with said servo motor for varying the operation of said bridge circuit, said variable resistance means disclosing its resistance variation in response to the output of said photo resistance means and to form limit indications.

8. An exposure control device as in claim 5, wherein said photosensitive means is a phototransistor.

9. A control system for controlling a load, a transistor bridge, output terminals at said transistor bridge, switch means in series with at least one of said output terminals, control means responsive to the output of the load for controlling at least one of said transistors in said bridge, said switch means being responsive to the operation of the load for disconnecting the load when the load operates in a range beyond the predetermined limit.

10. A control system for automatic control of exposure, comprising a resistance bridge, said resistance bridge including a photosensitive element, differential amplifier means coupled to the output of said resistance bridge, a second differential amplifier means responsive to said first differential amplifier means and operative to invert the signals of said first differential amplifyer, a drive control circuit, said resistance bridge having a plurality of additional elements, said electromagnetic means being coupled to one of said elements for constraining said bridge toward balance in response to signals applied to said electromagnetic means.

11. A system as in claim 10, wherein said first differential amplifier means includes an input circuit, feed back means connected between said electromagnetic means and said input circuit, said feedback means including a capacitor and a resistor.

* * * * *